(12) United States Patent
Kang

(10) Patent No.: US 6,894,816 B2
(45) Date of Patent: May 17, 2005

(54) METHOD AND APPARATUS FOR RECORDING/REPRODUCING OPTICAL INFORMATION

(75) Inventor: Byung-Bok Kang, Seoul (KR)

(73) Assignee: Daewoo Electronics Co., Ltd. (KR)

( * ) Notice: Subject to any disclaimer, the term of this patent is extended or adjusted under 35 U.S.C. 154(b) by 179 days.

(21) Appl. No.: 10/209,495

(22) Filed: Jul. 30, 2002

(65) Prior Publication Data

US 2003/0189741 A1 Oct. 9, 2003

(30) Foreign Application Priority Data

Apr. 9, 2002 (KR) ........................................ 2002-19141

(51) Int. Cl.⁷ ................................................ G03H 1/04
(52) U.S. Cl. .................... 359/35; 359/900; 365/125; 365/216
(58) Field of Search ............................ 359/35, 21, 900; 356/450, 457, 458; 369/102, 103; 365/124, 125, 215, 216; 382/288, 291

(56) References Cited

U.S. PATENT DOCUMENTS 5,777,760 A 7/1998 Hays et al. ..................... 359/7

6,232,045 B1 * 5/2001 Jacobowitz et al. ........ 430/321

FOREIGN PATENT DOCUMENTS

| JP | 0263733 | 2/2002 |
| WO | 0180229 | 10/2001 |

* cited by examiner

Primary Examiner—Thong Nguyen
Assistant Examiner—Arnel C. Lavarias
(74) Attorney, Agent, or Firm—Anderson Kill & Olick, PC

(57) ABSTRACT

In a holographic digital data storage system, holographic page data has at least two concentric patterns with the optical information arranged within an outermost pattern of at least two concentric patterns. Since at least two concentric patterns in the holographic page data are deformed into at least two elliptic patterns in the diffracted beam caused by irradiation of the reference beam, at least two elliptic patterns are extracted from the diffracted beam and then at least two elliptic patterns are estimated to generate at least two estimated concentric patterns. A compensated vector between said at least two elliptic patterns and said at least two estimated concentric patterns is used to reconstruct the optical information from the diffracted beam.

11 Claims, 3 Drawing Sheets

METHOD AND APPARATUS FOR RECORDING/REPRODUCING OPTICAL INFORMATION

FIELD OF THE INVENTION

The present invention relates to a holographic digital data storage system; and, more particularly, to a method and apparatus for recording/reproducing optical information in the holographic digital data storage system by using at least two concentric patterns as a servo pattern.

BACKGROUND OF THE INVENTION

As is well known, demands for an optical storage system that can store a large amount of data, such as data for a motion picture film, have been increasing. Therefore, various types of holographic digital data storage systems incorporating therein a storage medium made of a photo-refractive crystal such as lithium niobate or the like have been recently developed for realizing high density optical storage capabilities.

The holographic digital data storage system allows a signal beam having information therein to interfere with a reference beam to generate an optical interference pattern therebetween and, then controls the optical interference pattern to be stored in the storage medium such as a photo-refractive crystal, wherein the photo-refractive crystal is a material which may react differently on optical interference patterns depending on the respective amplitudes and phases thereof. In case the incident angle, the amplitude r the phase of the reference beam is changed, hundreds or thousands of binary data may be superposedly recorded at one location on a page-by-page basis.

In the holographic digital data storage system, a signal beam is modulated with rectangular page data so that the modulated signal beam may have a shape of rectangle which is equal to that of a displaying device. However, a Gaussian distribution of a circular laser beam may cause the rectangular page data to be deformed. In such event, a peripheral region of the rectangular page data may be considerably damaged. Although circular page data may be used to modulate the signal beam, a rectangular servo pattern has been used to generate a servo signal for modifying an irradiation location of the reference beam, thereby resulting in an inefficient reproduction of the circular page data.

SUMMARY OF THE INVENTION

It is, therefore, a primary object of the present invention to provide a method and apparatus for efficiently recording/reproducing optical information in a holographic digital data storage system by using at least two concentric patterns as a servo pattern.

In accordance with a preferred embodiment of the invention, there is provided a method for recording optical information in a holographic digital data storage system which includes a holographic memory formed of a photo-refractive crystal, a reference beam generator for generating a reference beam of a wavelength to be supplied into the holographic memory, an encoder for encoding the optical information to generate holographic page data, a signal beam supplier for supplying a signal beam, modulated with the holographic page data, of the wavelength into the holographic memory so that the reference beam interferes with the signal beam to produce an optical interference pattern therebetween, a detector for detecting a diffracted beam from the optical interference pattern of the holographic memory caused by irradiation of the reference beam into the holographic memory and an analyzer for analyzing the diffracted beam to restore the optical information, the method comprising the steps of:

(a) generating at least two concentric patterns as a servo pattern; and (b) arranging the optical information within an outermost pattern of said at least two concentric patterns to generate circular page data as the holographic page data.

In accordance with another preferred embodiment of the invention, there is provided a method for reproducing optical information in a holographic digital data storage system which includes a holographic memory formed of a photo-refractive crystal, a reference beam generator for generating a reference beam of a wavelength to be supplied into the holographic memory, an encoder for encoding the optical information to generate holographic page data, a signal beam supplier for supplying a signal beam, modulated with the holographic page data, of the wavelength into the holographic memory so that the reference beam interferes with the signal beam to produce an optical interference pattern therebetween, a detector for detecting a diffracted beam from the optical interference pattern of the holographic memory caused by irradiation of the reference beam into the holographic memory and an analyzer for analyzing the diffracted beam to restore the optical information, wherein the holographic page data has at least two concentric patterns with the optical information arranged within an outermost pattern of said at least two concentric patterns and said at least two concentric patterns in the holographic page data are deformed into at least two elliptic patterns in the diffracted beam, the method comprising the steps of:

(a) extracting said at least two elliptic patterns from the diffracted beam;

(b) estimating said at least two elliptic patterns to generate at least two estimated concentric patterns so that a compensated vector is generated between said at least two elliptic patterns and said at least two estimated concentric patterns; and (c) using the compensated vector to reconstruct the optical information from the diffracted beam.

In accordance with another aspect of the invention, there is provided an optical information recording/reproducing apparatus for recording optical information on a holographic memory formed of a photo-refractive crystal and reproducing the optical information from the holographic memory, the apparatus comprising:

means for generating a reference beam of a wavelength to be supplied to the holographic memory;

means for encoding the optical information to generate holographic page data;

means for supplying a signal beam of the wavelength to the holographic memory so that the reference beam interferes with the signal beam to produce an optical interference pattern therebetween, wherein the signal beam is modulated with the holographic page data;

means for detecting a diffracted beam from the optical interference pattern of the holographic memory caused by irradiation of the reference beam into the holographic memory; and means for analyzing the diffracted beam to restore the optical information, wherein the encoding means includes:

means for generating at least two concentric patterns as a servo pattern, and means for arranging the optical information within an outermost pattern of said at least two concentric patterns to generate circular page data as the holographic page data and wherein the analyzing means includes:

means for extracting at least two elliptic patterns from the diffracted beam, wherein said at least two concentric patterns in the holographic page data are deformed into said at least two elliptic patterns in the diffracted beam, means for estimating said at least two elliptic patterns to generate at least two estimated concentric patterns so that a compensated vector is generated between said at least two elliptic patterns and said at least two estimated concentric patterns, and means for using the compensated vector to reconstruct the optical information from the diffracted beam.

BRIEF DESCRIPTION OF THE DRAWINGS

The above and other objects and features of the present invention will become apparent from the following description of preferred embodiments given in conjunction with the accompanying drawings, in which.

DETAILED DESCRIPTION OF THE PREFERRED EMBODIMENTS

Figure 1:
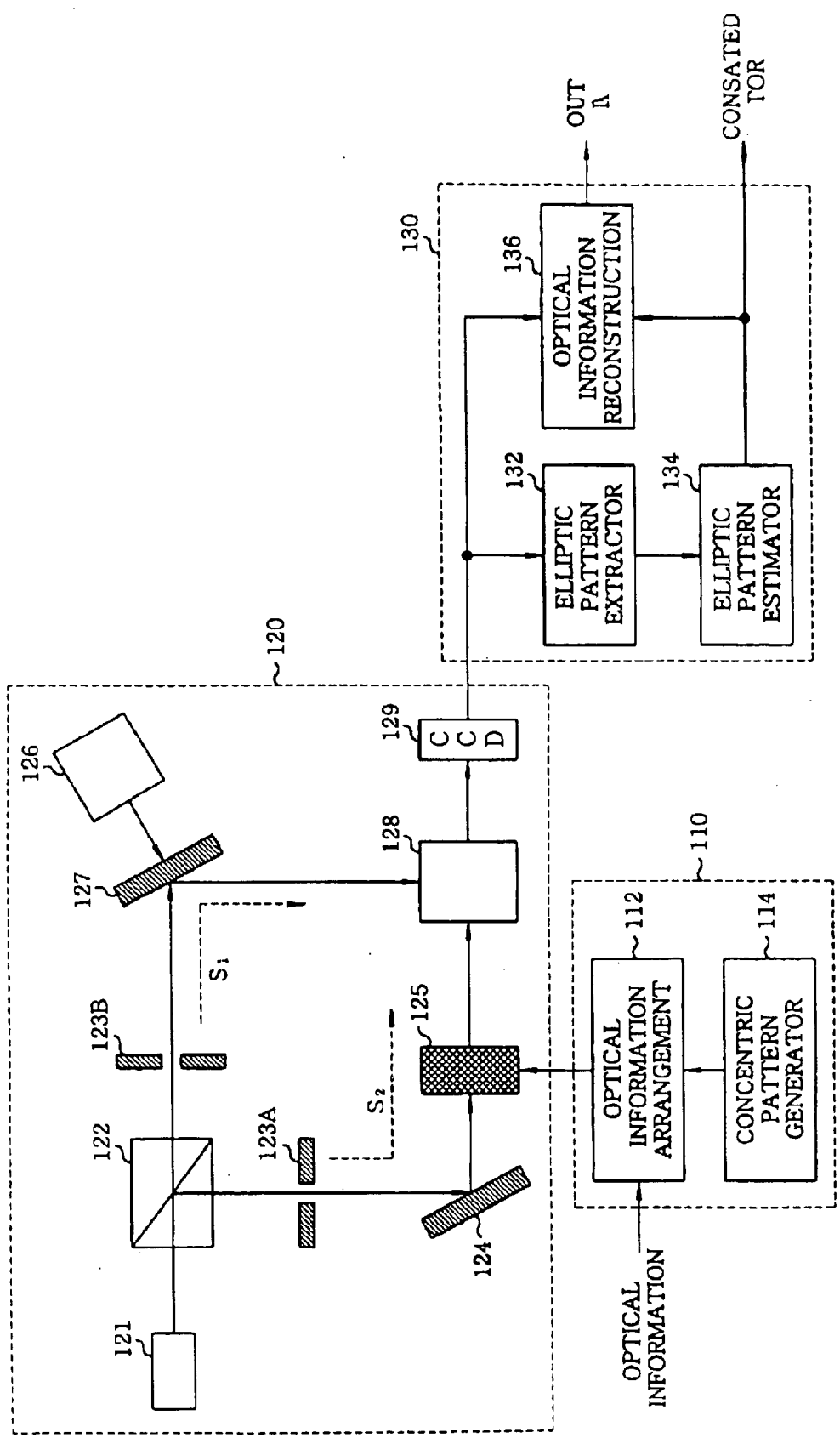
FIG. 1 represents a block diagram for illustrating a holographic digital data storage system in accordance with the present invention.

Referring to FIG. 1, there is shown a block diagram for illustrating a holographic digital data storage system in accordance with a preferred embodiment of the present invention, wherein the system comprises an encoding circuit 110, a recording and reconstructing circuit 120 and a decoding circuit 130.

The encoding circuit 110 has a concentric pattern generator 114 and an optical information arrangement unit 112. The encoding circuit 110 encodes optical information to generate circular page data to be provided to the recording and reconstructing circuit 120, wherein the optical information has an 1×m pixel array, 1 and m being positive integers, respectively, and each pixel has a binary value to represent a pixel brightness.

Figure 2:
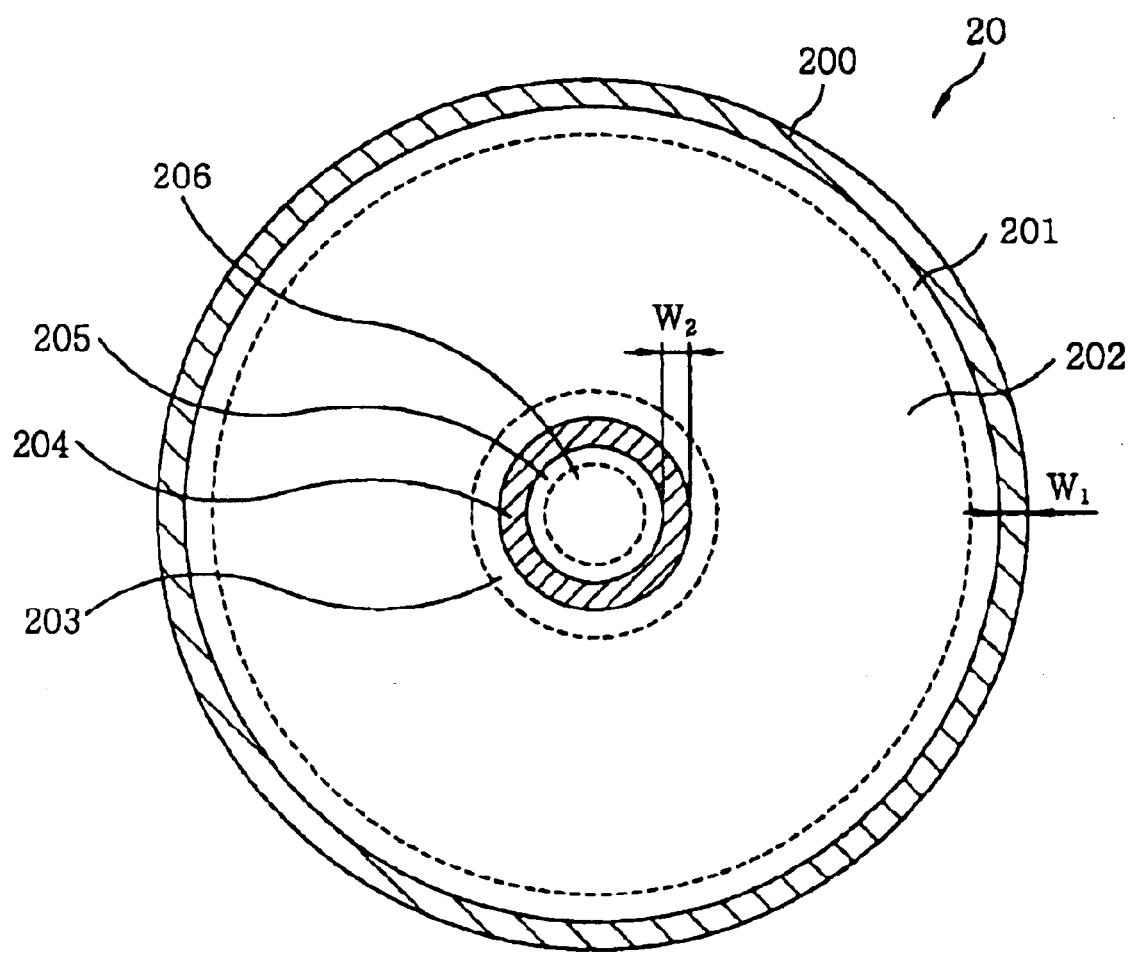
FIG. 2 shows circular page data with two concentric patterns in accordance with the present invention.

The concentric pattern generator 114 generates concentric patterns as a servo pattern. Referring to FIG. 2, there is shown circular page data 20 for illustrating two concentric patterns. Two concentric patterns, i.e., outermost pattern 200 and an innermost pattern 204, are belt-shaped with predetermined belt widths $w_1$ and $w_2$, respectively. Each of two concentric patterns 200 and 204 includes a plurality of discontinuous pixels disposed with a belt-shaped pattern.

The optical information arrangement unit 112 arranges the optical information of the 1×m pixel array within the outermost pattern 200 to generate the circular page data 20. The optical information may not be overlapped with two concentric patterns 200 and 204 themselves. Referring back to FIG. 2, there are shown three spacer belts 201, 203 and 205 on which no information is recorded and two data regions 202 and 206 on which the optical information is recorded. Three spacer belts 201, 203 and 205 are preferably inserted along the inner circle of the outermost pattern 200 and the outer and the inner circle of the innermost pattern 204, respectively, so that the circular page data 20 may be separated into two concentric patterns 200 and 204 and two data region 202 and 206. For example, while two concentric patterns 200 and 204 are made f white pixels with a pixel value '1', three spacer belts 201, 203 and 205 are made f black pixels with a pixel value '0'. In another example, address information on e optical information may be arranged within the innermost pattern 204.

The recording and reconstruction circuit 120 has a laser 121, a beam splitter 122, a first and a second shutter 123A and 123B, a first and a second mirror 124 and 127, an actuator 126, a spatial light modulator (SLM) 125, a storage medium 128 and a charge coupled device (CCD) 129. In the recording and reconstruction circuit 120, a laser beam emitted from the laser 121 has generally a shape of circle and impinges onto the beam splitter 122 which is capable of partially reflecting the laser beam to thereby obtain a reference and a signal beam, wherein the reference beam is a portion of the laser beam transmitted through the beam splitter 122 and the signal beam is a remaining portion of the laser beam reflected from the beam splitter 122.

The reference beam enters into the storage medium 128 through a reference beam path (S1) after being reflected by the first mirror 127 which is controlled by the actuator 126. In the meantime, after being reflected by the second mirror 124, the signal beam enters through a signal beam path (S2) into the SLM 125 at which the signal beam may be modulated with the circular page data fed from the optical information arrangement unit 112 of the encoding circuit 110.

Then, the signal beam is focused on the storage medium 128. In the storage medium 128, the signal beam interferes with the reference beam to thereby generate an optical interference pattern therebetween, wherein the optical interference pattern contains information on the signal beam, i.e., information on the circular page data. The optical interference pattern is converted into an optical index pattern in the storage medium 128 whose refractive index changes in response to the optical interference pattern to thereby record the signal beam into the storage medium 128. The storage medium 128 is a holographic memory formed of a photorefractive crystal.

To read the signal beam recorded in the storage medium 128, only the first shutter 123B remains open while the second shutter 123A turns to be closed so that only the reference beam may be introduced to the storage medium 128 as a reconstruction reference beam. If the reconstruction reference beam is introduced into the storage medium 128, a diffracted beam, i.e., a diffracted beam corresponding to the optical index pattern, may be generated in the storage medium 128, wherein the diffracted beam is generated from the optical interference pattern of the storage medium caused by irradiation of the reconstruction reference beam into the storage medium. The diffracted beam enters the CCD 129 which is capable of detecting the power of the diffracted beam to reconstruct the circular page data. The reconstructed circular page data is transmitted to the decoding circuit 130.

The decoding circuit 130 has an elliptic pattern extractor 132, an elliptic pattern estimator 134 and an optical information reconstruction unit 136. The reconstructed circular page data is transmitted to the elliptic pattern extractor 132 and the optical information reconstruction unit 136.

The elliptic pattern extractor 132 extracts two elliptic patterns from the diffracted beam. It is suggested that two concentric patterns in the holographic page data may be deformed into two elliptic patterns in the diffracted beam, respectively.

The elliptic pattern estimator 134 estimates two elliptic patterns to generate two estimated concentric patterns. According to a projected invariant property of projected concentric circle centers, under any projective transformation, the projected concentric circle center, i.e., the projected concentric pattern center, must be on a line which is constructed with the ellipse centers of the ellipses, i.e., the elliptic patterns, that result from the projection of the concentric circles, i.e., the concentric patterns. Specifically, from each of two elliptic patterns, the ellipse centers are detected so that a line through the ellipse centers may be constructed. After intersection points between the line and the elliptic patterns are detected, the projected concentric circle center may be estimated by using a cross ratio between the intersection points and then two estimated concentric patterns may be generated. Then, a compensated vector between two elliptic patterns and two estimated concentric patterns may be provided to the optical information reconstruction unit 136.

The optical information reconstruction unit 136 uses the compensated vector to reconstruct the optical information. The reconstructed optical information is outputted as output data. The compensated vector may be used to generate a servo signal for modifying an irradiation location of the reference beam so that another diffracted beam dislocated by the compensated vector may be obtained. In another example, the compensated vector may be used to compensate the diffracted beam itself.

Figure 3:
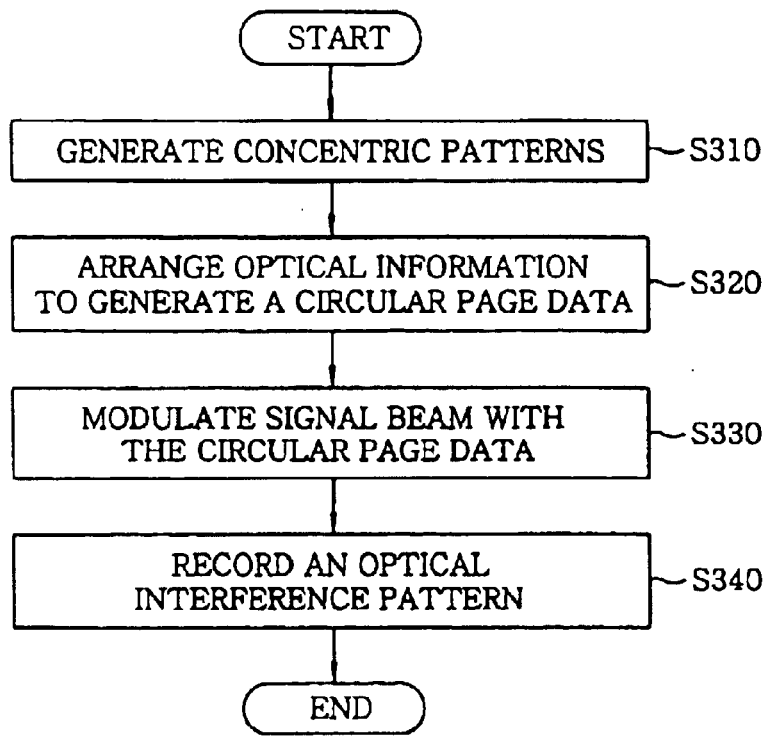
FIG. 3 describes a flow chart for recording optical information in accordance with the present invention.

Referring to FIG. 3, there is shown a flow chart for recording the optical information in accordance with the present invention.

At step S310, at least two concentric patterns are generated as servo-pattern information. As shown in FIG. 2, two concentric patterns, i.e., outermost pattern 200 and an innermost pattern 204, are belt-shaped with predetermined belt widths $w_1$, and $w_2$, respectively.

At step S320, the optical information of the 1×m pixel array is arranged within the outermost pattern 200 to generate the circular page data 20. The optical information may not be overlapped with two concentric patterns 200 and 204 themselves.

At step S330, the circular page data 20 is used to modulate the signal beam.

At step S340, the signal beam interferes with the reference beam so that an optical interference pattern between the signal beam and the reference beam may be recorded in the holographic memory.

Figure 4:
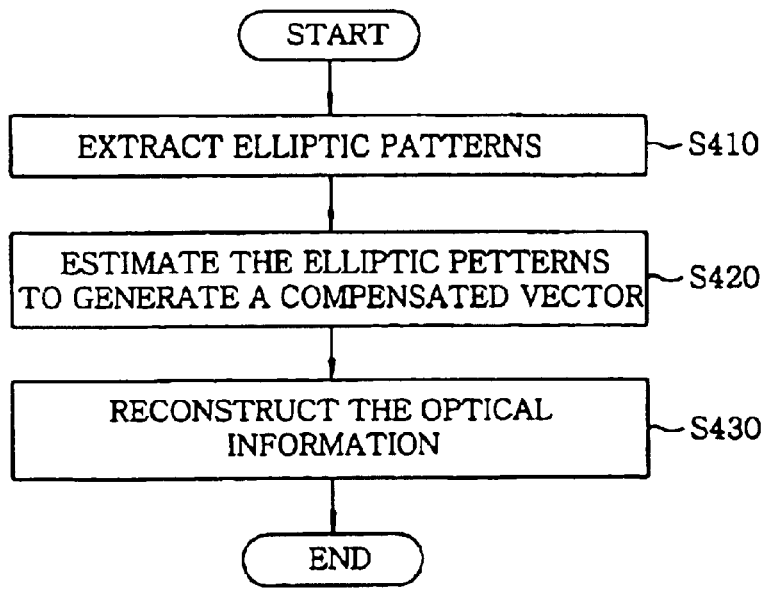
FIG. 4 provides a flow chart for reconstructing holographic page data to restore the optical information from the holographic memory in accordance with the present invention.

Referring to FIG. 4, there is shown a flow chart for reconstructing holographic page data to restore the optical information from the holographic memory in accordance with the present invention. It is suggested that the holographic page data has at least two concentric patterns with the optical information arranged within an outermost pattern of at least two concentric patterns. It is also suggested that two concentric patterns in the holographic page data are deformed into two elliptic patterns in the diffracted beam.

At step S410, two elliptic patterns are extracted from the diffracted beam.

At step S420, two elliptic patterns are estimated to generate two estimated concentric patterns. Specifically, from each of two elliptic patterns, an ellipse center is detected so that a line through two ellipse centers may be constructed. After intersection points between the line and the elliptic patterns are detected, the projected concentric circle center may be estimated by using a cross ratio between the intersection points and then two estimated concentric patterns may be generated. Then, a compensated vector between two elliptic patterns and two estimated concentric patterns may be generated.

At step S430, the compensated vector is used to reconstruct the optical information. The reconstructed optical information is outputted as output data. The compensated vector may be used to generate a servo signal for modifying an irradiation location of the reference beam so that another diffracted beam dislocated by the compensated vector may be obtained. In another example, the compensated vector may be used to compensate the diffracted beam itself.

While the invention has been shown and described with respect to the preferred embodiments, it will be understood by those skilled in the art that various changes and modifications may be made without departing from the spirit and scope of the invention as defined in the following claims.

What is claimed is:

1. An optical information recording/reproducing apparatus for recording optical information on a holographic memory formed of a photo-refractive crystal and reproducing the optical information from the holographic memory, the apparatus comprising:

means for generating a reference beam of a wavelength to be supplied into the holographic memory;

means for encoding the optical information to generate holographic page data;

means for supplying a signal beam of the wavelength into the holographic memory so that the reference beam interferes with the signal beam to produce an optical interference pattern therebetween, wherein the signal beam is modulated with the holographic page data;

means for detecting a diffracted beam from the optical interference pattern of the holographic memory caused irradiation of the reference beam into the holographic memory; and means for analyzing the diffracted beam to restore the optical information, wherein the encoding means includes:

means for generating at least two concentric patterns as a servo pattern, and means for arranging the optical information within an outermost pattern of said at least two concentric patterns to generate circular page data as the holographic page data and wherein the analyzing means includes:

means for extracting at least o elliptic patterns from the diffracted beam, wherein said at least two concentric patterns in the holographic page data are deformed into said at least two elliptic patterns in the diffracted beam, means for estimating said at least two elliptic patterns to generate at least two estimated concentric patterns so that a compensated vector is generated between said at least two elliptic patterns and said at least two estimated concentric patterns, and means for using the compensated vector to reconstruct the optical information from the diffracted beam.

2. The method of claim 1, wherein the optical information is not overlapped with said at least two concentric patterns.

3. The apparatus of claim 1, wherein each one of said at least two concentric patterns is belt-shaped with a predetermined belt width.

4. The apparatus of claim 1, wherein address information on the optical information is arranged within an innermost pattern of said at least two concentric patterns.

5. The apparatus of claim 1, wherein said at least two elliptic patterns are estimated with a projected invariant property of projected concentric circle centers.

6. The apparatus of claim 1, wherein the compensated vector is used to generate a servo signal for modifying an irradiation location of the reference beam to obtain another diffracted beam dislocated by the compensated vector.

7. The apparatus of claim 1, wherein the compensated vector is used to compensate the diffracted beam.

8. A method for reproducing optical information in a holographic digital data storage system which includes a holographic memory formed of a photo-refractive crystal, a reference beam generator for generating a reference beam of a wavelength to be supplied into the holographic memory, an encoder for encoding the optical information to generate holographic page data, a signal beam supplier for supplying a signal beam, modulated with the holographic page data, of the wavelength into the holographic memory so that the reference beam interferes with the signal beam to produce an optical interference pattern therebetween, a detector for detecting a diffracted beam from the optical interference pattern of the holographic memory caused by irradiation of the reference beam into the holographic memory and an analyzer for analyzing the diffracted beam to restore the optical information, wherein the holographic page data has at least two concentric patterns with the optical information arranged within an outermost pattern of said at least two concentric patterns and said at least two concentric patterns in the holographic page data are deformed into at least two elliptic patterns in the diffracted beam, the method comprising the steps of:

(a) extracting said at least two elliptic patterns from the diffracted beam;

(b) estimating said at least two elliptic patterns to generate at least two estimated concentric patterns so that a compensated vector is generated between said at least two elliptic patterns and said at least two estimated concentric patterns; and (c) using the compensated vector to reconstruct the optical information from the diffracted beam.

9. The method of claim 8, wherein said at least two elliptic patterns are estimated with a projected invariant property of projected concentric circle centers.

10. The method of claim 8, wherein the compensated vector is used to generate a servo signal for modifying an irradiation location of the reference beam to obtain another diffracted beam dislocated by the compensated vector.

11. The method of claim 8, wherein the compensated vector is used to compensate the diffracted beam.

* * * * *